(12) United States Patent
Park et al.

(10) Patent No.: US 12,126,205 B2
(45) Date of Patent: Oct. 22, 2024

(54) HIGH SENSITIVITY RESONANT DRIVE SCHEME FOR RF FACE TRACKING

(71) Applicant: MICROSOFT TECHNOLOGY LICENSING, LLC, Redmond, WA (US)

(72) Inventors: Chang Joon Park, Sunnyvale, CA (US); Martin Francis Galinski, III, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 365 days.

(21) Appl. No.: 17/585,462

(22) Filed: Jan. 26, 2022

(65) Prior Publication Data

US 2023/0236309 A1  Jul. 27, 2023

(51) Int. Cl.
*G01S 13/88* (2006.01)
*G01S 13/08* (2006.01)
*G06F 1/16* (2006.01)
*H02J 7/00* (2006.01)

(52) U.S. Cl.
CPC ............ *H02J 7/0063* (2013.01); *G06F 1/163* (2013.01)

(58) Field of Classification Search
CPC ........ H02J 7/0063; G06F 1/163; G06F 3/017; G06F 3/012; H02M 3/015
See application file for complete search history.

(56) References Cited

U.S. PATENT DOCUMENTS

| | | | |
|---|---|---|---|
| 3,503,007 A | 3/1970 | Kutschbach | |
| 10,564,717 B1 | 2/2020 | Shahmohammadi et al. | |
| 2009/0219039 A1 | 9/2009 | Fasshauer | |
| 2014/0104184 A1* | 4/2014 | Meador | G01P 15/125 345/173 |
| 2014/0379351 A1* | 12/2014 | Raniwala | G06V 40/20 704/270 |
| 2016/0018846 A1* | 1/2016 | Zenoff | G06F 1/1647 345/204 |

(Continued)

OTHER PUBLICATIONS

"International Search Report and Written Opinion Issued in PCT Application No. PCT/US22/048311", Mailed Date: Feb. 10, 2023, 10 Pages.

(Continued)

*Primary Examiner* — Giovanni Astacio-Oquendo
*Assistant Examiner* — Zannatul Ferdous
(74) *Attorney, Agent, or Firm* — Scott Y. Shigeta; Newport IP, LLC

(57) ABSTRACT

A system for facial movement detection with reduced size and reduced cost by employing a novel resonant drive and sampling scheme is disclosed. An example battery operated system includes a driver circuit, an LC resonance circuit formed by an inductor circuit and a capacitance from an antenna, and a sample and hold circuit. The driver circuit can be configured by a controller to generate a drive signal for the LC resonance circuit, which has a resonant frequency that changes as the capacitance of the antenna varies responsive to facial movements of the user. The sample and hold circuit samples the output of the LC resonance circuit responsive to a falling edge of the drive signal for the LC resonance circuit, wherein an output of the sample and hold circuit is a sampled sense signal that may be further processed to detect facial movements of the user.

20 Claims, 9 Drawing Sheets

(56) References Cited

U.S. PATENT DOCUMENTS

2019/0361519 A1\* 11/2019 Lee ........................ G06F 3/012
2020/0085084 A1    3/2020 Piel et al.
2023/0104809 A1    4/2023 Park et al.
2023/0205309 A1\*  6/2023 Park ................... H02M 7/4815
                                                          345/156

OTHER PUBLICATIONS

"International Search Report and Written Opinion Issued in PCT Application No. PCT/US22/041286", Mailed Date: Nov. 30, 2022, 13 Pages.
Notice of Allowance mailed on Aug. 16, 2024, in U.S. Appl. No. 17/548,441, 10 pages.

\* cited by examiner

HIGH SENSITIVITY RESONANT DRIVE SCHEME FOR RF FACE TRACKING

BACKGROUND

Mixed Reality (MR), like Augmented Reality (AR) and Virtual Reality (VR), is an industry with a rapidly expanding footprint. An MR device may be implemented with a headset that includes video and audio components to provide the immersive MR experience. Sensors, such as gyroscopic sensors, may be located on or within the headset to sense physical movement of the user. Additional sensors may be located about the headset to track eye gaze of the user, sense audible commands from the user, and to sense other aspects of the user.

Various face tracking schemes that may be employed to sense small movements of the user's skin, which can be processed to identify facial expression and other indicia that may be used to enhance the immersive MR experience. In one example scheme, a headset may be equipped with circuits that include a number of sense antennas that are positioned about various locations of the headset. The antennas signals may feed into an LC resonance circuit, which is driven to a resonance by an LC driver. The output of the LC resonance circuit may feed into a sense amplifier to provide suitable signals for an Analog-to-Digital Converter (ADC), which can convert the sensed signals into the digital domain for further processing. Capacitance of the LC resonance circuit varies depending on the distance between the sense antennas on the headset and the facial skin of the user. The distance between the skin and the antennas varies may also vary with the facial expression of the user due to movement of the skin from facial muscles. Thus, the total capacitance of the LC resonance circuit, and thus the characteristic transient response and Q of the LC resonance circuit, will vary based on the user's facial movements and the resulting varied distance between the antennas and the user's skin.

The present disclosure contemplates that a conventional implementation of an LC resonant drive circuit may require relatively high power-supply levels when compared to a typical battery in a portable device. This is in part due to the overall design of a conventional system, where the amplitude of the sensed signal from the LC resonance circuit should be as large as possible to maximize the overall dynamic range and resolution that may be achieved in an analog-to-digital conversion process.

The presently disclosed techniques propose solutions for MR wearable devices to achieve sufficient resolution without requiring the additional of expensive and bulky inductor that may otherwise be required for satisfactory performance of LC resonance circuit. A reduced power consumption of the overall circuit may be achieved, while reducing overall circuit area and cost of manufacturing. Additionally, high sensitivity in RF facial tracking is maintained with the presently disclosed schemes. The disclosure made herein is presented with respect to these and other technical challenges.

SUMMARY

The techniques disclosed herein are directed to devices, circuits, systems and methods for facial movement detection with reduced circuit area, and reduced cost by employing a novel resonant drive and sampling scheme. An example battery operated system includes a driver circuit, an LC resonance circuit formed by an inductor circuit and a capacitance from an antenna, and a sample and hold circuit. The driver circuit can be configured by a controller to generate a drive signal for the LC resonance circuit, which has a resonant frequency that changes as the capacitance of the antenna varies responsive to facial movements of the user. The sample and hold circuit samples the output of the LC resonance circuit responsive to a falling edge of the drive signal for the LC resonance circuit, wherein an output of the sample and hold circuit is a sampled sense signal that may be further processed to detect facial movements of the user. By employing the described scheme, high sensitivity is achieved with reduced circuit area and reduced cost requirements.

The described embodiments may be implemented as devices, circuits, and systems, which may include software. This Summary is provided to introduce a selection of concepts in a simplified form that are further described below. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. References made to individual items of a plurality of items can use a reference number with a letter of a sequence of letters to refer to each individual item. Generic references to the items may use the specific reference number without the sequence of letters.

DETAILED DESCRIPTION

Figure 1:
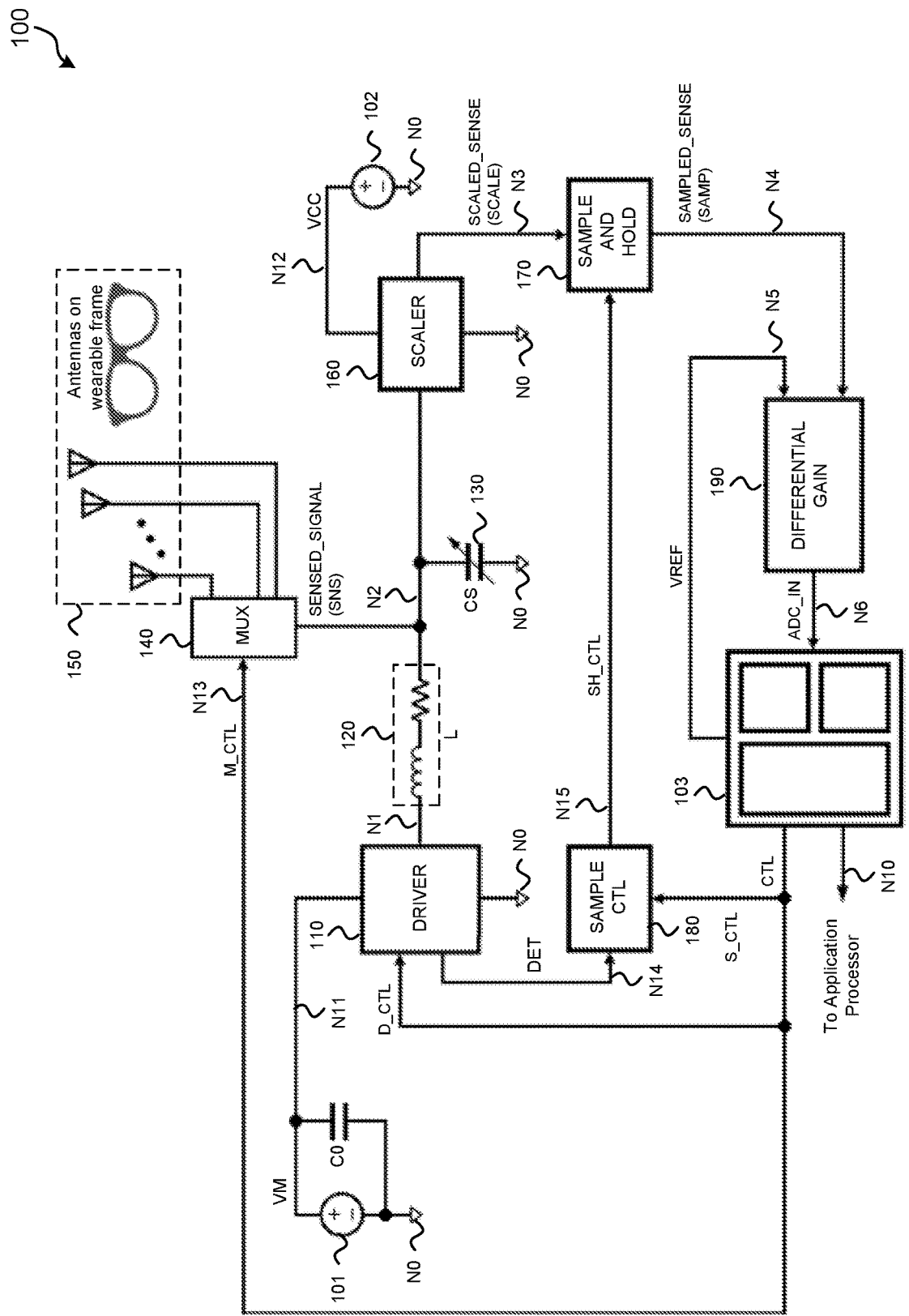
FIG. 1 shows an illustrative schematic of a first system that employs a high sensitivity resonant drive scheme, which can be used in RF facial detection applications.

In the following detailed description, reference is made to the accompanied drawings, which form a part hereof, and which is shown by way of illustration, specific example configurations of which the concepts can be practiced. These configurations are described in sufficient detail to enable those skilled in the art to practice the techniques disclosed herein, and it is to be understood that other configurations can be utilized, and other changes may be made, without departing from the spirit or scope of the presented concepts. The following detailed description is, therefore, not to be taken in a limiting sense, and the scope of the presented concepts is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means a direct electrical connection between the items connected, or an indirect connection through one or more passive or active intermediary devices and/or components. The terms "circuit" and "component" means either a single component or a multiplicity of components, either active and/or passive, that are coupled to provide a desired function. The term "signal" means at least a power, current, voltage, or data signal. Based upon context, the term "coupled" may refer to a wave or field coupling effect, which may relate to a corresponding magnetic field, electrical field, or a combined electromagnetic field.

Mixed Reality (MR), like Augmented Reality (AR) and Virtual Reality (VR), is an industry that has rapidly expanded its footprint. Low power and compact form factor are important design issue in such wearable devices, which require portability and long battery life. To achieve these requirements in term of low power and portability, systems, circuits and devices employed in face tracking schemes should exhibit both low power and area efficient aspects. An LC resonant driving scheme is an example topology which may achieve the required low power target since the signal is boosted at the target frequency due to the nature of the LC resonant principle. Device reliability and safety aspects may also be achieved in this topology.

The sense capacitance of the described face tracking system is dependent on the distance between the sense antenna and the facial skin of the user. The distance will be varied with the facial expression due to the movement of the skin responsive to facial muscle movement (e.g., contraction and relaxation). The present disclosure contemplates that conventional LC resonant drive circuits that may be employed for face tracking require high power consumption since the sensed signal to be processed by the Analog-to-Digital Converter (ADC), which may be implemented as a either a separate circuit or as part of another system component (e.g., part of a controller, a microprocessor, a microcontroller, or an ASIC), should be as large as possible to achieve higher resolution in the conversion process. Also, a fast and low distortion operational amplifier or buffer may be required in a conventional implementation, which is a power-hungry circuit component.

In contrast to conventional schemes, the LC resonant drive scheme of the present disclosure, with a DC-AC Converter, achieves a large signal amplitude for the sensed signal without high power consumption. The driver circuit (e.g., a half-bridge driver) for the LC resonance circuit may be integrated into an ASIC and thus may reduce the required circuit area and reduce the overall cost of the sensor solution.

The present disclosure further contemplates that a conventional LC resonant drive scheme uses a high Q-factor with a bulky inductor to achieve the peak gain at the resonant frequency. However, in the presently disclosed scheme, the RF face tracking processes the difference of signal amplitudes observed with different facial gestures. Therefore, in the presently disclosed scheme, the absolute value of Q-factor is not a critical parameter and the difference between the facial gestures can be processed (e.g., amplified) in an alternative way to achieve the desired sensitivity. In some examples according to the presently disclosed scheme, a sensed signal from the LC resonance circuit can be captured at the falling edge of the control signal from the system, and then amplified with a gain factor. In other words, a similar effect to a high Q-factor can be achieved locally with the proposed scheme, achieving a high sensitivity for RF face tracking with a reduced cost and reduced circuit area required in the wearable device.

FIG. 1 shows an illustrative schematic of a first system 100 that employs a high sensitivity resonant drive scheme, which can be used in RF facial detection applications. As illustrated, system 100 includes a first DC source 101, a second DC source 102, a driver circuit 110, an inductor circuit 120, a capacitor circuit 130, a multiplexer (MUX) circuit 140, one or more antennas 150, a scaler circuit 160, a sample and hold (S/H) circuit 170, sample control circuit 180, a differential gain circuit 190, and a controller circuit 103.

Node N0 is designated as a circuit ground (e.g., GND, 0V, etc.). The first DC source 101, which may simply be a battery, is coupled between node N11 and node N0 and provides a voltage VM at node N11. The second DC source 102 is coupled between node N12 and node N0, and provides a voltage VCC at node N12. A capacitor may be coupled between node N11 and node N0, and is designated as C0. Another capacitor (not shown) may be similarly be coupled between node N12 and N0. The capacitors on the DC sources 101, 102 may be employed as filter capacitors that stabilize the source voltages and provide noise immunity. In some examples, not shown, the first and second DC sources may correspond to the same source such as a common battery, while in other examples (as shown) the DC sources may be isolated from one another.

The driver circuit 110 includes a control signal input port (e.g., D_CTL) at node N13, a first power port (e.g., VM) at node N11, a second power port (e.g., GND, 0V, etc.) at node N0, a control signal output port (e.g., DET) at node N14, and a driver output port (e.g., DRV) at node N1. Inductor circuit 120 is coupled between node N1 and node N2, and has a value designated as L. Capacitor circuit 130 is coupled between node N2 and node N0, and is designated as variable capacitance with a value designated by CS. Inductor circuit 120 and capacitor circuit 130 together form an LC resonance circuit, which is driven at node N1 by the driver circuit 110, and responsively provides a sensed signal (SNS, SENSED_SIGNAL) at node N2. As shown, inductor circuit 120 is a non-ideal component and thus may include a characteristic series inductance and a series resistance.

MUX 140 includes a control signal port (e.g., M_CTL) at node N13, an input port (e.g., SNS) at node N2, and a plurality of output ports (e.g., OUT1, OUT2, ... OUTN) that are each coupled to a respective one of the antennas 150. Based on the control signal (e.g., M_CTL) at node N13, MUX 140 will selectively couple a selected one of the antennas 150 to node N2. Each of the antennas 150 may be located at different positions on a wearable frame that is worn by the user. The characteristic capacitance value CS of the capacitor circuit 130 corresponds to the characteristic capacitance of the antenna 150 that is selected by MUX 140, where the precise value may vary based on proximity and movement of the user's skin relative to the selected antenna.

The scaler circuit 160 includes a first power port (e.g., VCC) at node N12, a second power port (e.g., GND, 0V, etc.) at node N0, an input port (e.g., SNS) at node N2, and an output port (e.g., SCALE) at node N3. The scaler circuit 160 receives the sensed signal from the LC resonance circuit at node N2, and provides a scaled version of the signal (SCALED_SIGNAL) at node N3. The scaler circuit may optionally include a control port (not shown) to receive a control signal such that the scaler circuit may responsively adjust a scale factor between the input and output of the circuit.

S/H circuit 170 includes a control port (SH_CTL) at node N15, an input port (e.g., SCALE) at node N3, and an output port (SAMP) at node N4. Sample control circuit 180 includes a first control port (DET) at node N14, a second control port (S_CTL) at node N13, and an output port (SH_CTL) at node N15. Sample control circuit 180 is configured to sense and detect an edge transition associated with the driver circuit 110, and generate a sample and hold control signal (SH_CTL) at node N15. The S/H circuit 170 is triggered by the SH_CTL signal at node N15, and responsively samples the scaled sense signal (SCALE, SCALED_SENSE) at node N4 to provide the output at node N4 as a sampled sense signal (SAMP, SAMPLED_SENSE).

Differential gain circuit 190, includes a first input port (e.g., IN1) at node N4, a second input port (e.g., IN2) at node N5, and an output port (e.g., OUT) at node N6. The differential gain circuit 190 provides an output signal (ADC_IN) at node N6 responsive to a sensed difference between the voltages at nodes N4 and N5.

The controller circuit 103 includes an input port (e.g., IN) at node N6, a a first output port (e.g., OUT1) at node N13, a second output port (e.g., OUT2) at node N5, and a third output port (e.g., OUT3) at node N10. The controller circuit 103 is configured to receive the signals from the output of the differential gain circuit 190 at node N6, convert the received signals into a digital form through an ADC process, generate a reference voltage (VREF) for the differential gain circuit 190 at node N5, and to generate the timing and control signals (D_CTL, M_CTL, S_CTL, etc.) for the driver circuit 110, MUX circuit 140, the sample control circuit 180, or any other circuit components that may require control signals (e.g., scaler circuit 160, S/H circuit 170, etc.)

The proposed high sensitivity resonant drive scheme illustrated by system 100 of FIG. 1, corresponds to a DC-AC converter circuit that operates to convert the DC power to AC power via operation of driver circuit 110 and the LC resonance circuit formed by inductor circuit 120 and capacitor circuit 130. The operation of the driver circuit 110, including the frequency and phase of operation, is selected by the controller circuit 103 via the adjustment of one or more driver control signals (D_CTL) from node N13 (which may be a signal bus with multiple control signals).

DC-AC conversion is accomplished by driving pulses to the LC resonance circuit responsive to the one or more driver control signals (D_CTL). In a high cycle of a drive pulse, the driver circuit is configured in a first configuration where power is coupled to the LC resonance circuit from node N11 to node N1 such that node N1 corresponds to the voltage VM (e.g., the battery voltage, 5V, etc.). In this first configuration, current flows from node N11 through the driver circuit to node N1, from N1 to node N2 through the inductor circuit 120, and from node N2 to node N0 (e.g., circuit ground or GND) through the capacitor circuit 130. In a low cycle of the drive pulse, the driver circuit is configured in a second configuration where the circuit ground (e.g., GND, 0V, etc.) at node N0 is coupled to the LC resonance circuit at node N1. In this second configuration, current flows in a reverse direction from the capacitor circuit 130 at node N2 to node N1 through the inductor circuit 120, and from node N1 to node N0 (e.g., circuit ground or GND) through the driver circuit 110. The cooperative operation of the driver circuit 110 and the LC resonance circuit provides DC-AC conversion, which is responsive to the control signals (e.g., D_CTL) from the controller circuit 103.

After the DC-AC conversion is completed, the signal from the selected antenna can be evaluated to determine an antennas distance or proximity to the user's skin based on the changes in the signal detected at node N2 for that corresponding antenna. To evaluate the signal at node N2, an analog-to-digital conversion process can be used, such as via the controller circuit 103. In the analog-to-digital conversion process, the signal from node N2 is sampled, adjusted to maximize dynamic range prior to conversion, and then converted to a digital value that can evaluated by an application process (not shown). As shown in FIG. 1, a scaler circuit 160 can optionally sense the signal at node N2 and provide an initial gain adjustment (increased or decreased) to the signal from node N2 and provide a scaled sense signal at node N3, but this gain scaling may not be required in some implementations. Thus, in some examples, the sample and hold circuit 170 may sense the signal from node N2, which is then captured (or sampled) by the sample and hold circuit 170.

FIG. 1 further illustrates that a sample control circuit 180 can be used to sense or detect an edge transition from a signal (DET) from the driver circuit 110 at node N14, and responsively generate a sample and hold control signal (SH_CTL) at node N15. In example as shown in FIG. 1, the sample and hold control signal (SH_CTL) can be asserted to initiate a capture (or sample) of the scaled sense signal (SCALE) at node N3, where capture occurs responsive to an edge transition (e.g., a falling edge) of the driver signal from driver circuit 110. In another example (not shown), the scaler circuit 160 can be eliminated and the sample and hold control signal (SH_CTL) can be asserted to initiate a capture (or sample) of the sense signal (SNS) at node N2.

The functions of the sample control circuit 180 may be alternatively designed to respond to a control signal (e.g., S_CTL) from controller circuit 103 at node N13. In this example, the driver control signal (D_CTL) and the sample control signal (S_CTL) can be adjusted by controller circuit 103 (or by the sample control circuit in response to the S_CTL signal) to ensure the timing considerations are appropriate for proper capture of the sensed signals by the sample and hold circuit 170. In additional examples, the sample control circuit 180 may be combined into the function of another system components, such as the driver circuit 110 or the sample and hold circuit 170. In still other examples, the sample control circuit 180 may be eliminated, and the controller circuit 103 may be configured to directly control the sample and hold control signal (SH_CTL) for proper timing.

Figure 2:
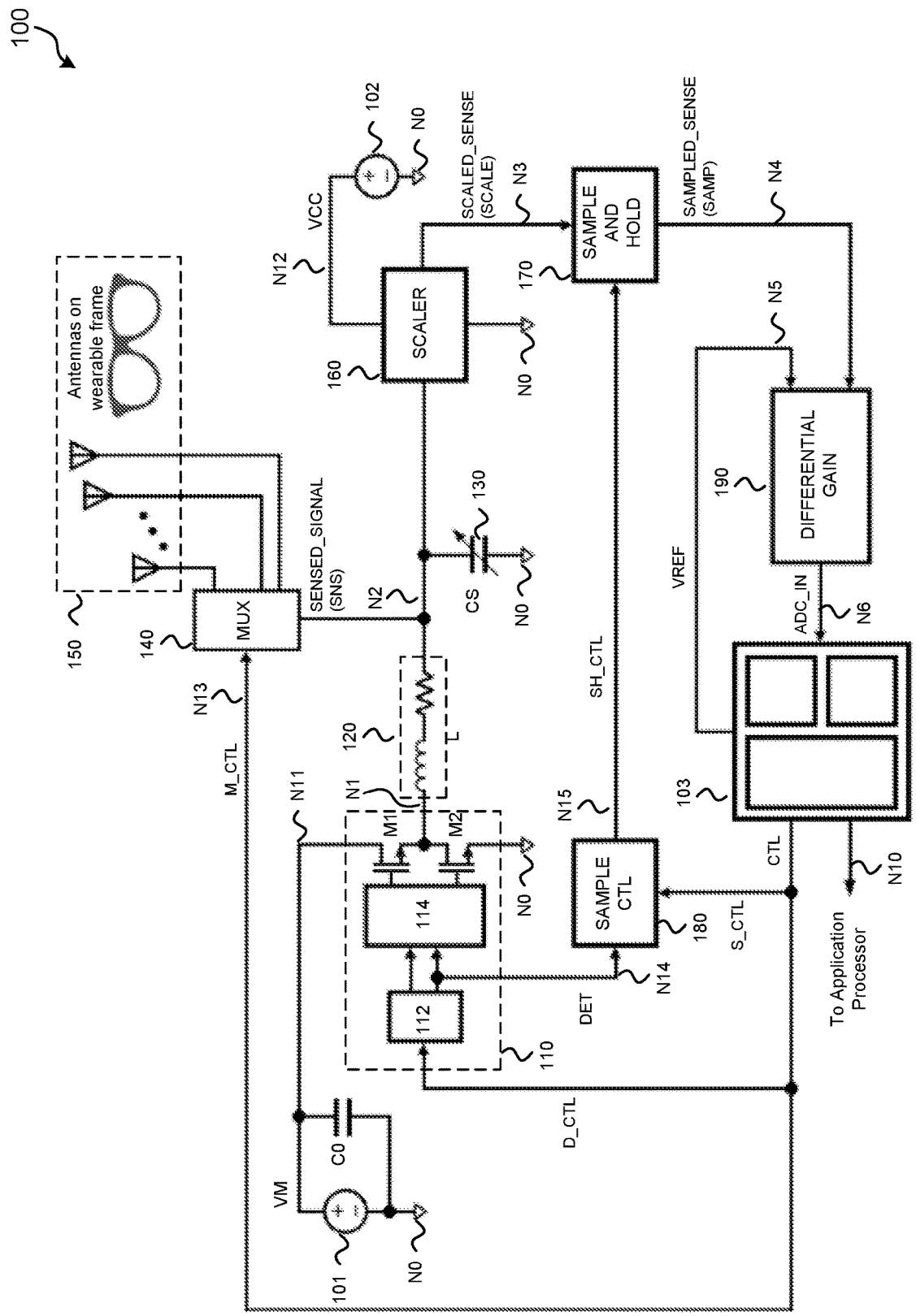
FIG. 2 shows an illustrative schematic of a second system that employs a high sensitivity resonant drive scheme, which can be used in RF facial detection applications.

FIG. 2 shows an illustrative schematic of a second system 200 that employs a high sensitivity resonant drive scheme, which can be used in RF facial detection applications. As illustrated, system 200 includes a first DC source 101, a second DC source 102, a driver circuit 110, an inductor circuit 120, a capacitor circuit 130, a multiplexer (MUX) circuit 140, one or more antennas 150, a scaler circuit 160, a sample and hold (S/H) circuit 170, sample control circuit 180, a differential gain circuit 190, and a controller circuit 103. The example system 200 of FIG. 2 is substantially similar to FIG. 1, where like components and nodes are similarly labeled. A detailed example implementation of a driver circuit 110 is also illustrated in FIG. 2.

The driver circuit 110 in FIG. 2 is arranged as a half-bridge driver that includes a logic block 112 a gate driver block 114, and n-type FETs M1 and M2. The logic block 112 includes an input port coupled to node N13, and also includes a pair of outputs (e.g., H for the top drive, and L for the low drive) coupled to the gate driver block 114. Gate driver block 114 includes a first output (e.g., VGH) that is coupled to a gate of FET M1 and responsive to the high drive (H) from logic block 112, and a second output (e.g., VGL) that is coupled a gate of FET M2 and responsive to the low driver (L) from logic block 112. FET M1 further includes a drain coupled to node N11 and as source coupled to node N1. FET M2 further includes a drain coupled to node N1 and as source coupled to node N0.

Operationally, the signal at node N13 may represent a single control signal or multiple control signals (e.g., a multi-bit control signal), which controls the timing and duty cycle of the charging of the inductor circuit 120 via the control of FETS M1 and M2 of driver circuit 110. The switched operation of FET M1 and FET M2 should be with sufficient speed so that the first FET M1 and the second FET M2 are not active at the same time, preventing significant switching or shoot-through currents. The logic circuit 112 and the gate driver circuit 114 of driver circuit 170 may be combined in function in some example implementations.

An additional output signal is shown from as output from the logic block 112, which corresponds to the low side driver (L) to the gate driver, and also the DET signal at node N14 as previously described. This output signal indicates the drive signal timing, and thus can be used by the sample control circuit 180 to synchronize the timing of the sample and hold circuit 170.

The driver circuits illustrated in FIG. 2 is illustrated as including N-type FETS for the first FET and the second FET. However, the specific implementations are not so limited, and other implementations may include P-type FETS, or combinations of N-type and P-type FETS, without departing from the spirit of the present disclosure. Additionally, the logic block and gate drive blocks may be arranged to provide non-overlapping switched operation of N-type FETS, P-type FETS, or any combinations thereof.

Figure 3:
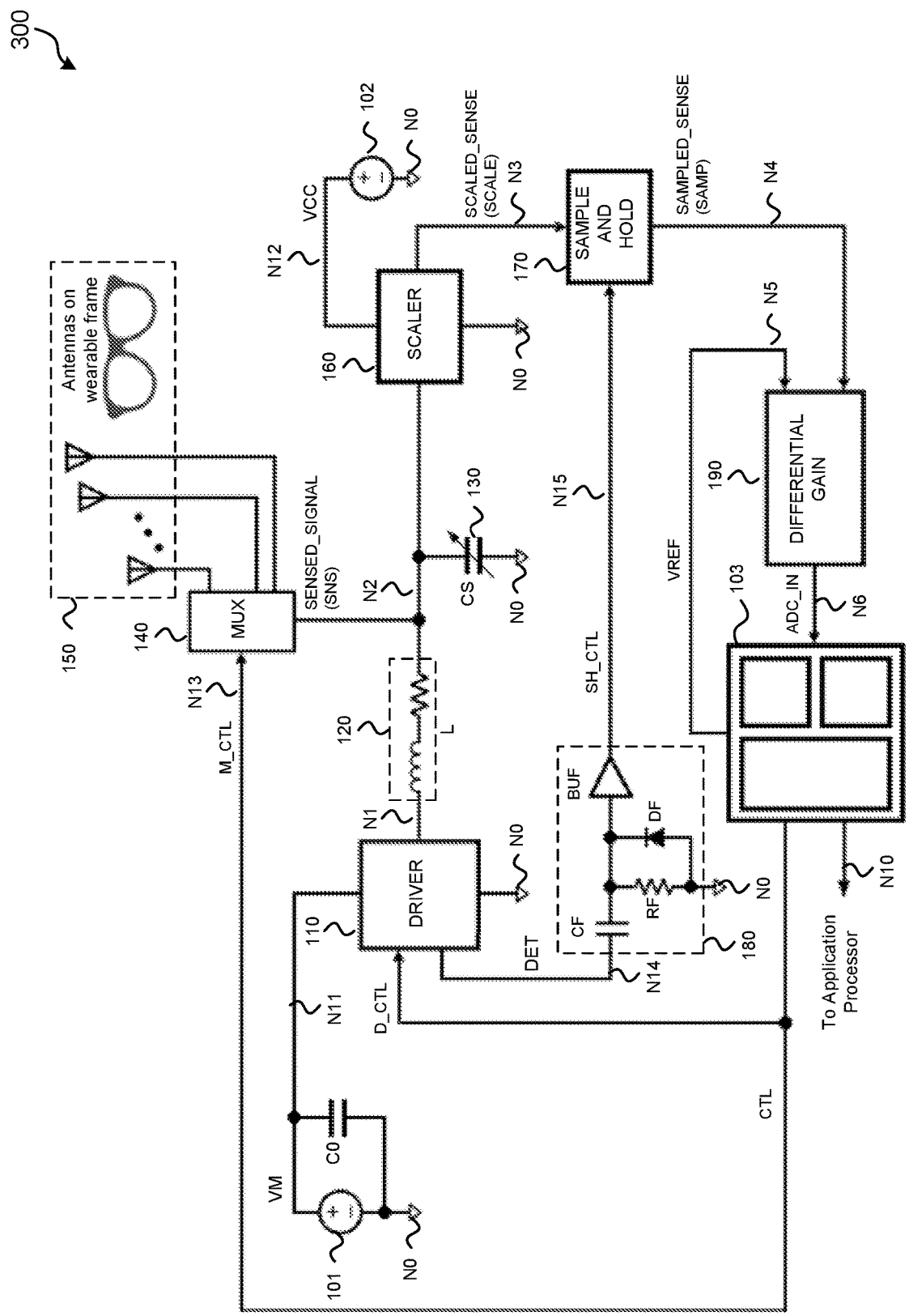
FIG. 3 shows an illustrative schematic of a third system that employs a high sensitivity resonant drive scheme, which can be used in RF facial detection applications.

FIG. 3 shows an illustrative schematic of a third system 300 that employs a high sensitivity resonant drive scheme, which can be used in RF facial detection applications. As illustrated, system 300 includes a first DC source 101, a second DC source 102, a driver circuit 110, an inductor circuit 120, a capacitor circuit 130, a multiplexer (MUX) circuit 140, one or more antennas 150, a scaler circuit 160, a sample and hold (S/H) circuit 170, sample control circuit 180, a differential gain circuit 190, and a controller circuit 103. The example system 300 of FIG. 3 is substantially similar to FIG. 1 and FIG. 2, where like components and nodes are similarly labeled. A detailed example implementation of a sample control circuit 180 is also illustrated in FIG. 3.

The sample control circuit 180 in FIG. 3 is arranged as an edge detector or one-shot circuit that includes a capacitor CF, a resistor RF, a diode DF and a buffer BUF. Capacitor CF is coupled between node N14 and an input of buffer BUF. Resistor RF and diode DF are coupled together in parallel, with one side coupled to the input of buffer BUF and the other side coupled to node N0. The output of BUF is coupled to node N15.

Operationally, changes in the signal at node N14 are detected as an AC coupled signal at the input of the buffer via capacitor CF. Capacitor CF and resistor RF together form a high-pass filter with an RC time constant. The RC time constant of capacitor CF and resistor RF determine the timing and width of a pulse that is generated by the buffer, which corresponds to the sample and hold control signal SH_CTL at node N15. In some configurations, a cathode of a Diode DF can be coupled to the input of the buffer BUF and the anode of the Diode DF can be coupled to the N0 node and the resistor RF. Diode DF provides a discharge path for capacitor CF so that the capacitor CF is able to quickly discharge when the DET signal goes low, thus preventing a level shift from occurring on the input of the circuit.

Figure 4:
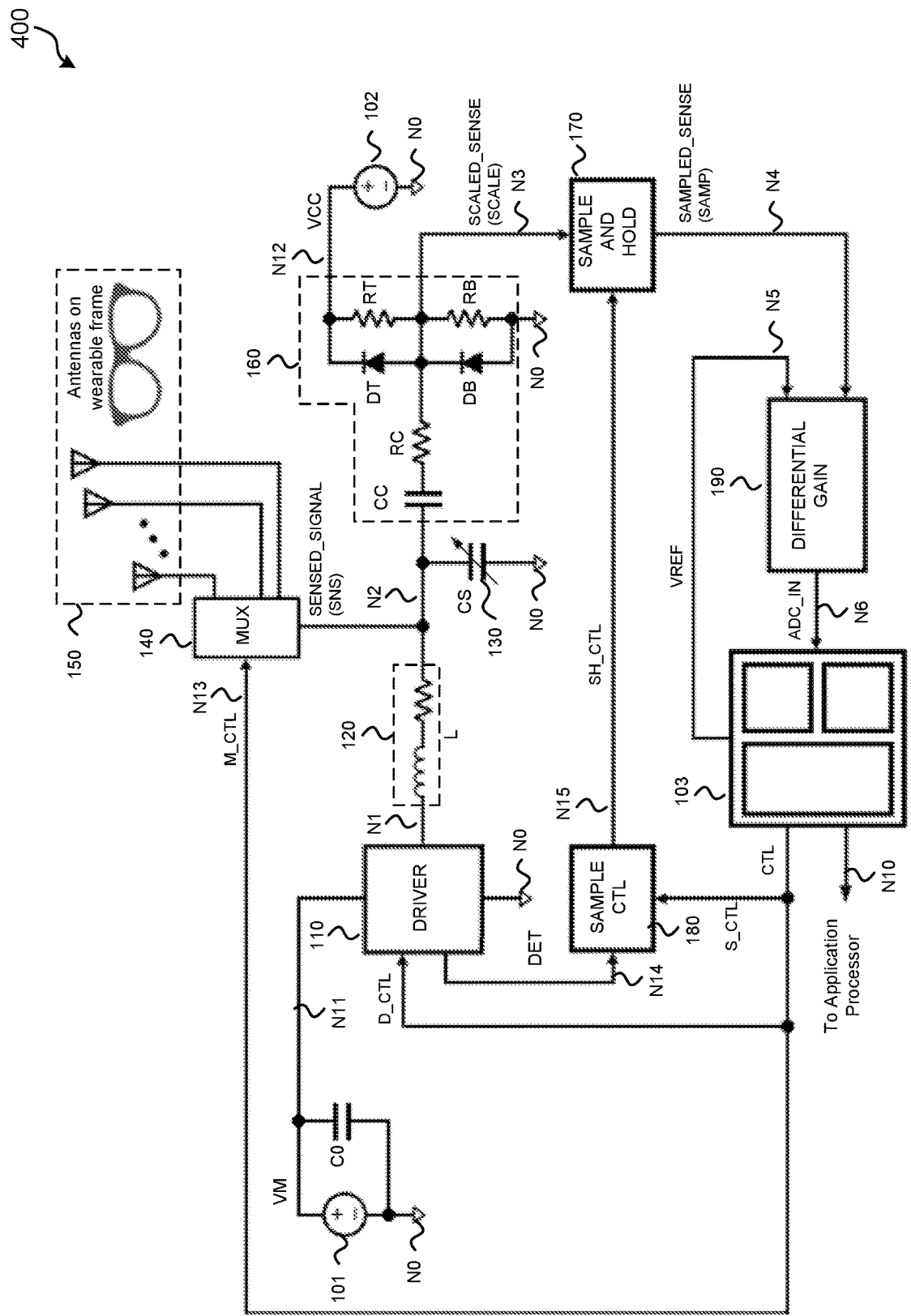
FIG. 4 shows an illustrative schematic of a fourth system that employs a high sensitivity resonant drive scheme, which can be used in RF facial detection applications.

FIG. 4 shows an illustrative schematic of a fourth system 400 that employs a high sensitivity resonant drive scheme, which can be used in RF facial detection applications. As illustrated, system 400 includes a first DC source 101, a second DC source 102, a driver circuit 110, an inductor circuit 120, a capacitor circuit 130, a multiplexer (MUX) circuit 140, one or more antennas 150, a scaler circuit 160, a sample and hold (S/H) circuit 170, sample control circuit 180, a differential gain circuit 190, and a controller circuit 103. The example system 400 of FIG. 4 is substantially similar to FIG. 1, FIG. 2, and FIG. 3, where like components and nodes are similarly labeled. A detailed example implementation of a scaler circuit 160 is also illustrated in FIG. 4.

Scaler circuit 160 of FIG. 4 includes a capacitor CC, resistors RC, RT, RB, and diodes DT and DB. Resistor RT is coupled between node N12 and node N3 while resistor RB is coupled between node N3 and node N0. Diode DT is coupled in parallel with resistor RT, while diode DB is coupled in parallel with resistor RB. Capacitor CC is coupled between node N2 and an intermediate node. Resistor RC is coupled between the intermediate node and node N3.

The capacitor CC is an AC coupling capacitor that, together with resistor RC, provides DC isolation between the LC resonance circuit at node N2 and the voltage divider formed by resistors RT and RB. In some examples, the value of the coupling capacitor 140 will be in a range of about 0.1 nF to about 1 nF, with nominal values on the order of about 0.5 nF, so as to not significantly impact the LC filter response. The AC response to the pulses driven into the LC filter will result in a hi Q resonance response that has a significant high voltage (e.g., about 10 Vp-p to about 50 Vp-p).

Resistors RT and RB are configured as a voltage divider the adjusts the DC level of the AC coupled output signal from the LC filter at node N2 (via coupling capacitor CC and isolation resistor RC), and also apply a scaling factor to the signal. The objective of the scaler circuit 160 is to maximize the conversion efficiency and resolution of an analog-to-digital converter (ADC) in the controller 103.

In some examples as illustrated, the scaler circuit 160 may include use of a DC source 102. DC source 102 provides a DC supply voltage, VCC, to the series combination of resistors RT and RB. When the values of RT and RB are matched, the DC voltage at the common node will be VCC/2. Example resistance values for resistors RT and RB are in a range of about 10K ohms to about 30K ohms, and nominally about 20K ohms. Resistor RC operates as part of the voltage scaler for the AC component of the signal from node N2, which can reduce the signal amplitude to match the headroom of the ADC located in the controller circuit 103. Example resistance values for resistor RC are in a range from about 50K ohms to about 150K ohms, with nominal values of about 100K ohms. In some examples, the voltage VCC at node N12 corresponds to the battery voltage VM at node N11: and thus DC source 102 may be eliminated in such an implementation.

Figure 5:
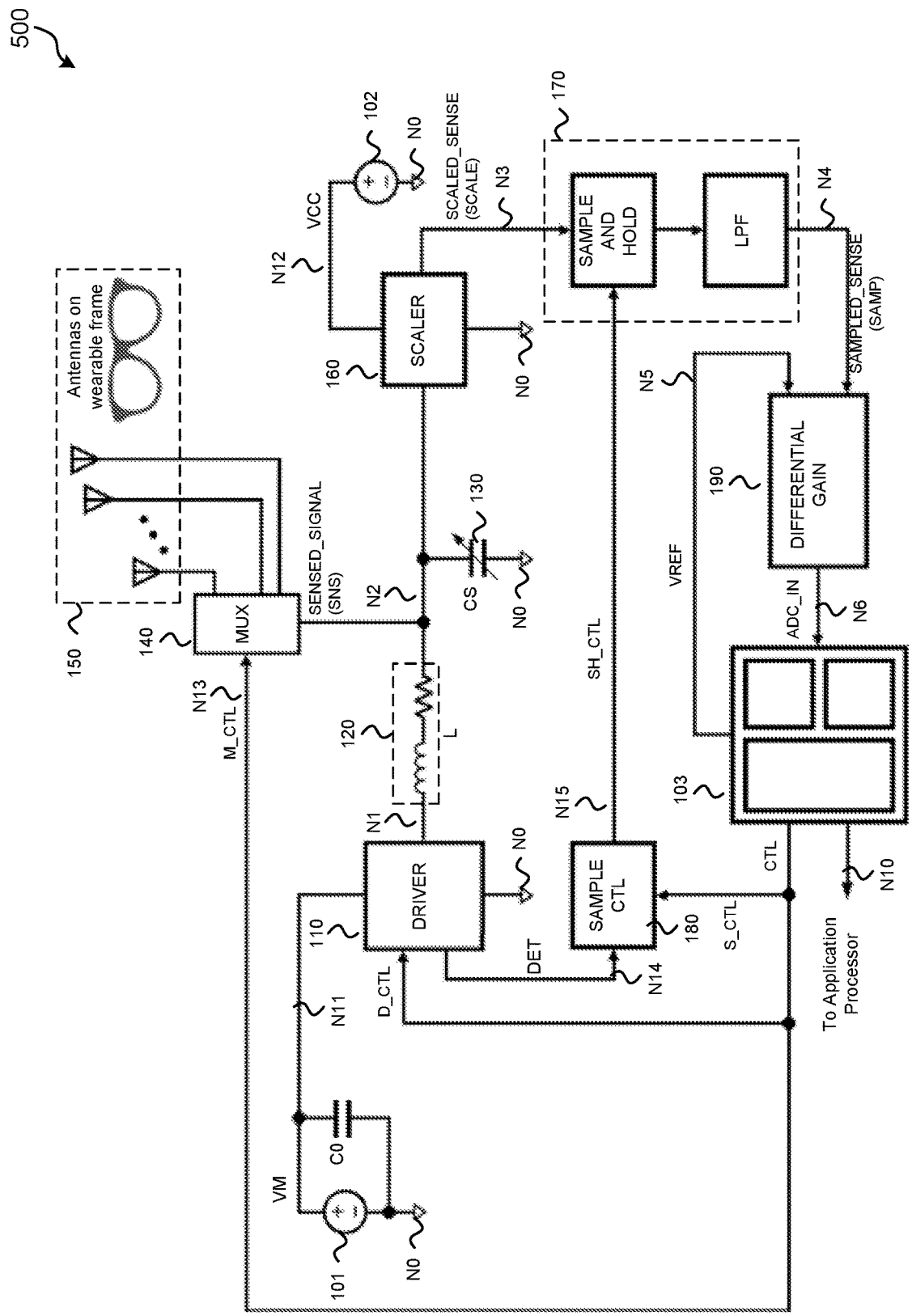
FIG. 5 shows an illustrative schematic of a fifth system that employs a high sensitivity resonant drive scheme, which can be used in RF facial detection applications.

FIG. 5 shows an illustrative schematic of a fifth system 500 that employs a high sensitivity resonant drive scheme, which can be used in RF facial detection applications. As illustrated, system 500 includes a first DC source 101, a second DC source 102, a driver circuit 110, an inductor circuit 120, a capacitor circuit 130, a multiplexer (MUX) circuit 140, one or more antennas 150, a scaler circuit 160, a sample and hold (S/H) circuit 170, sample control circuit 180, a differential gain circuit 190, and a controller circuit 103. The example system 500 of FIG. 5 is substantially similar to FIG. 1, FIG. 2, FIG. 3, and FIG. 4, where like components and nodes are similarly labeled. A further example implementation of with a sample and hold circuit 170 is also illustrated in FIG. 5.

As shown in FIG. 5, the sample and hold circuit may include a low pass filter on the output of the sampling portion of the circuit. The low pass filter can be configured to smooth abrupt changes in the sampled sensed signal at node N4 so that the differential gain circuit 190 does not excessively thrash the input to the analog-to-digital converter (ADC) in the controller circuit 103 at node N6.

Figure 6:
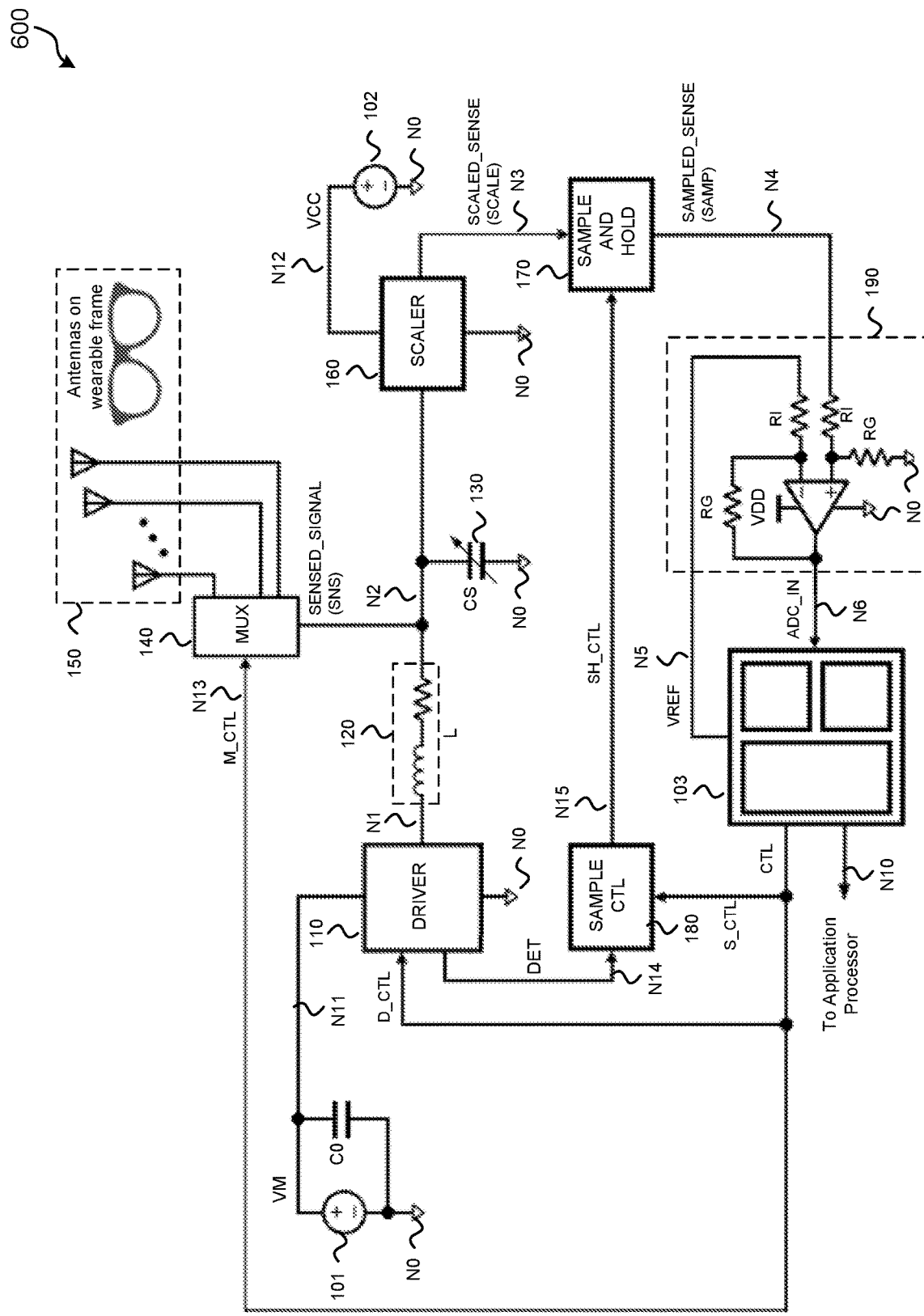
FIG. 6 shows an illustrative schematic of a sixth system that employs a high sensitivity resonant drive scheme, which can be used in RF facial detection applications.

FIG. 6 shows an illustrative schematic of a sixth system 600 that employs a high sensitivity resonant drive scheme, which can be used in RF facial detection applications. As illustrated, system 600 includes a first DC source 101, a second DC source 102, a driver circuit 110, an inductor circuit 120, a capacitor circuit 130, a multiplexer (MUX) circuit 140, one or more antennas 150, a scaler circuit 160, a sample and hold (S/H) circuit 170, sample control circuit 180, a differential gain circuit 190, and a controller circuit 103. The example system 600 of FIG. 6 is substantially similar to FIG. 1, FIG. 2, FIG. 3, FIG. 4 and FIG. 5, where like components and nodes are similarly labeled. A further example implementation of with differential gain circuit 190 is also illustrated in FIG. 6.

Differential gain circuit 190 of FIG. 6 includes an amplifier and four resistors, labeled as RG and RI based on value. A first resistor, with value RI, includes a first end that is coupled to node N4 and a second end that is coupled to the non-inverting input of the amplifier at a first intermediate node. A second resistor, with value RG, includes a first end that is coupled to the non-inverting input of the amplifier at the first intermediate node, and a second end that is coupled to node N0. A third resistor, with value RI, includes a first end that is coupled to node N5 and a second end that is coupled to the inverting input of the amplifier at a second intermediate node. A fourth resistor, with value RG, includes a first end that is coupled to the inverting input of the amplifier at the second intermediate node, and a second end that is coupled to node N5. Node N5 corresponds to a reference signal VREF, which is provided by the controller circuit 103, while node N4 corresponds to the output of the sample and hold circuit 170.

The configuration described above can be referred to as a differential amplifier, where the differential gain of the circuit is given as: GAIN=RG/RI, and where the VREF signal provides a DC offset. Assuming VREF=0V, then the signal ADC_IN may be simply given as: V(ADC_IN)=V(SAMP)*RG/RI. When VREF is non-zero, the gain can be expressed as: V(ADC_IN)=[V(SAMP)−VREF]*RG/RI. The gain of the differential amplifier can be set by the ratio between two resistors around the amplifier (RG and RI). For example, to a achieve a gain of 10, the resistor values may be set as RG=10KΩ and RI=1KΩ.

Figure 7:
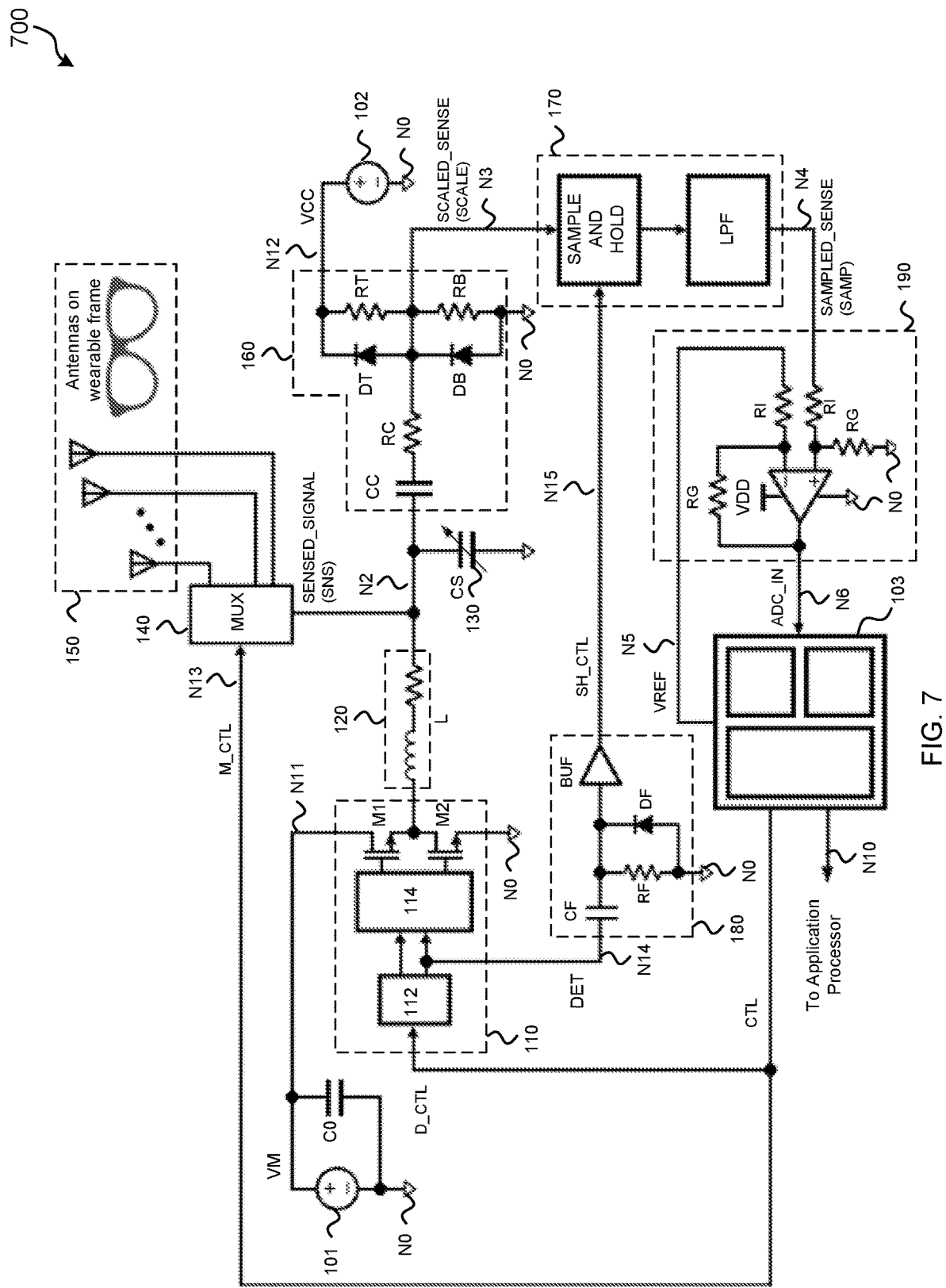
FIG. 7 shows an illustrative schematic of a seventh system that employs a high sensitivity resonant drive scheme, which can be used in RF facial detection applications.

FIG. 7 shows an illustrative schematic of a seventh system 700 that employs a high sensitivity resonant drive scheme, which can be used in RF facial detection applications. As illustrated, system 700 includes a first DC source 101, a second DC source 102, a driver circuit 110, an inductor circuit 120, a capacitor circuit 130, a multiplexer (MUX) circuit 140, one or more antennas 150, a scaler circuit 160, a sample and hold (S/H) circuit 170, sample control circuit 180, a differential gain circuit 190, and a controller circuit 103. The example system 700 of FIG. 7 is substantially similar to FIG. 1, FIG. 2, FIG. 3, FIG. 4, FIG. 5 and FIG. 6, where like components and nodes are similarly labeled. A detailed implementation of all major functional blocks are illustrated in FIG. 6.

Figure 8:
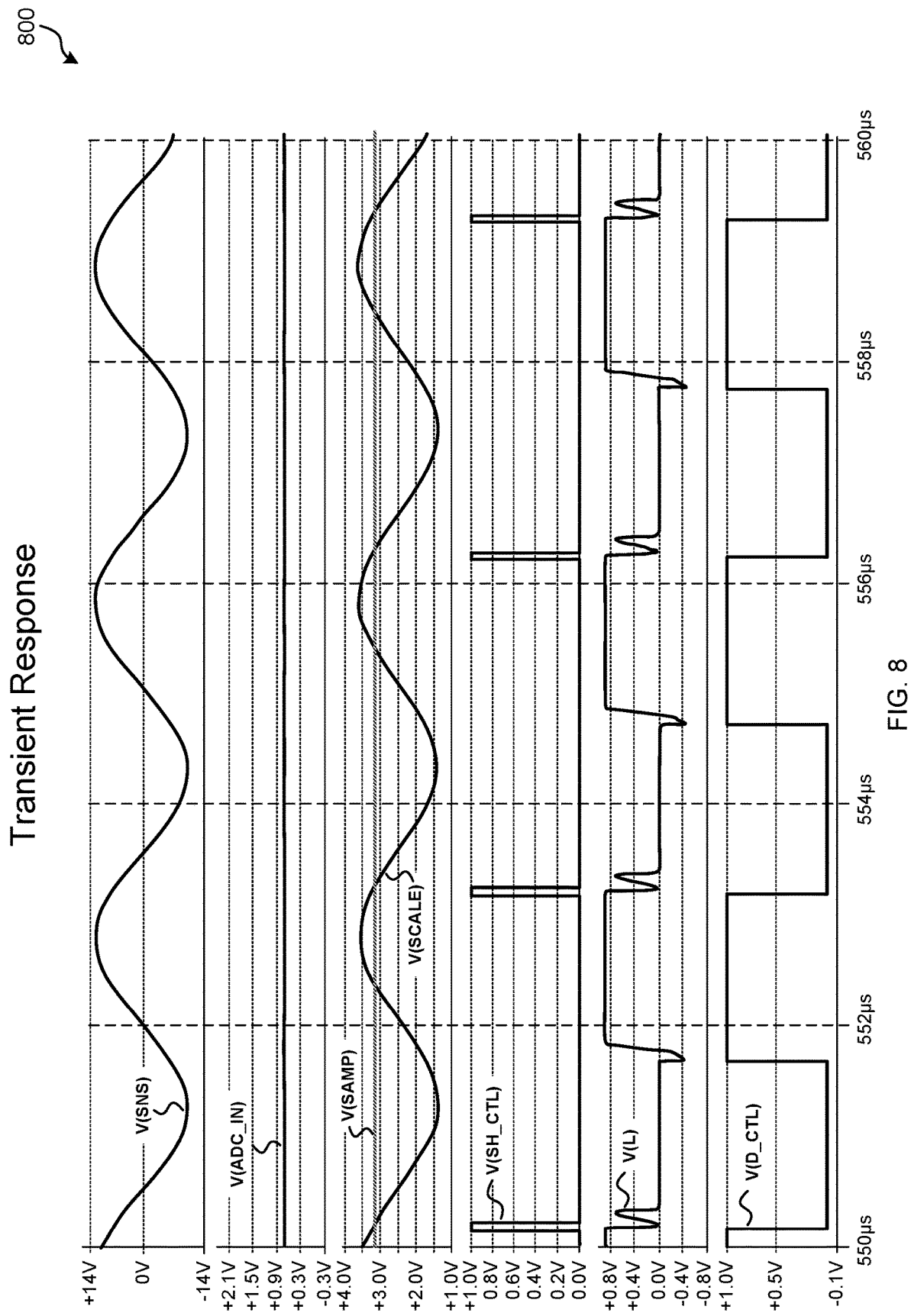
FIG. 8 shows a set of graphs illustrating a transient response for a high sensitivity resonant drive scheme.
Figure 9:
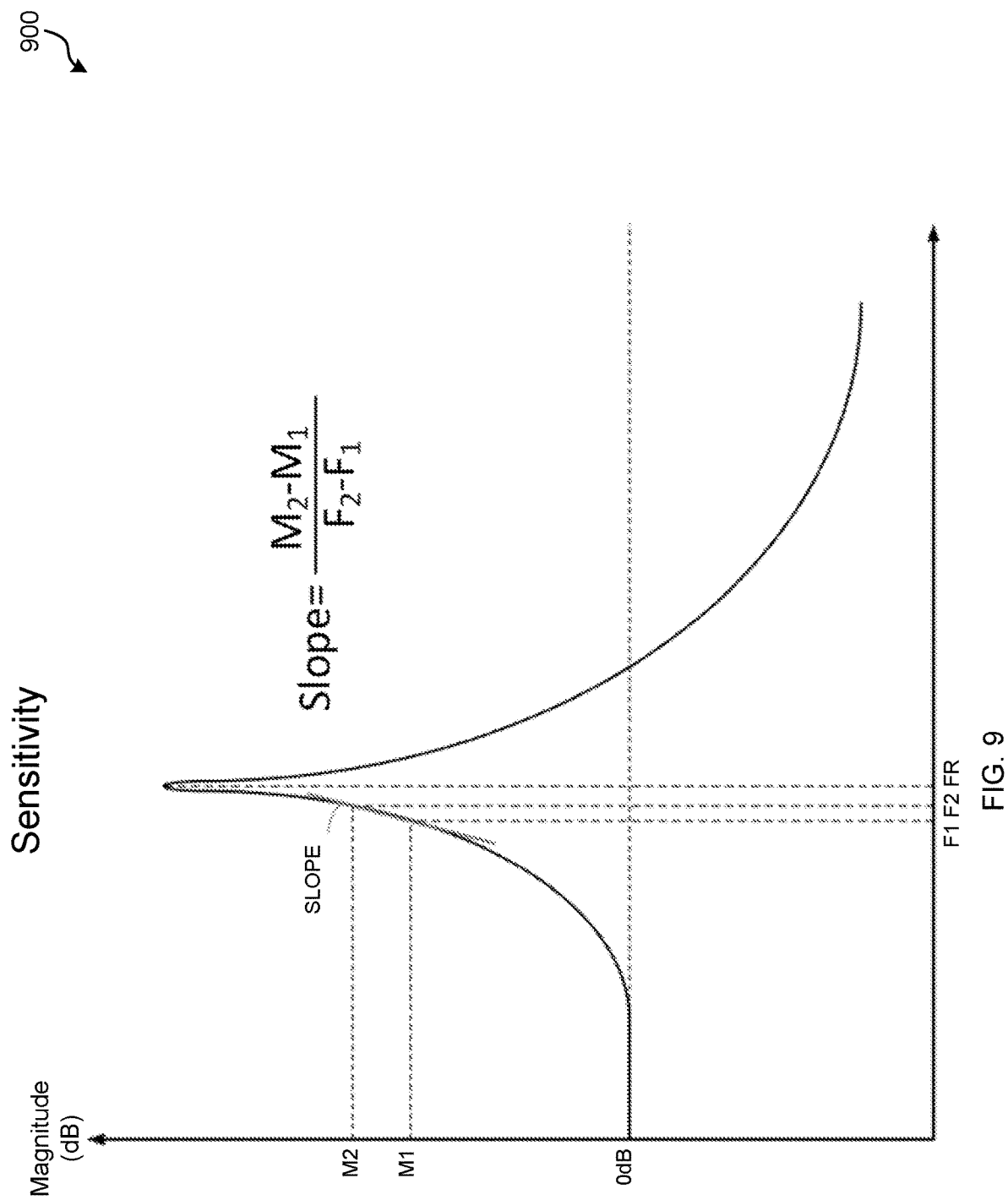
FIG. 9 shows a graph illustrating the variation in sensitivity for a Q-controlled filter employed in a high sensitivity resonant drive scheme in accordance with aspects of the present disclosure.

FIG. 8 shows a set of graphs illustrating a transient response for a high sensitivity resonant drive scheme. FIG. 7 will be referenced with respect to the transient response waveforms of FIG. 8, but all of the systems 100-700 described herein are equally applicable in terms of modes and principal of operation. Waveforms for the signals V(SNS), V(ADC_IN), V(SAMP), V(SCALE), V(SH_CTL), V(L), and V(D_CTL) are shown in FIG. 8. FIG. 9 shows a graph illustrating the variation in sensitivity for a Q-controlled filter employed in a high sensitivity resonant drive scheme, and is also applicable to all system described herein.

The proposed high sensitivity resonant drive scheme corresponds to a DC-AC converter circuit that operates to convert the DC power to AC power via operation of driver circuit 110 and the LC resonance circuit formed by inductor circuit 120 and capacitor circuit 130. The operation of the driver circuit 110, including the frequency and phase of operation, is selected by the controller circuit 103 via the adjustment of one or more driver control signals (D_CTL) from node N13 (which may be a signal bus with multiple control signals). As shown in FIG. 8, V(D_CTL), which is the voltage associated with the driver control signal (D_CTL), may be a pulse signal that has an amplitude of about 1V (for example), although this is merely one example and should not be so limited.

The DC-AC converter may generate the AC power having a peak voltage that is at an intermediate level being between the DC voltage of the battery (e.g., DC source 101), and the peak AC voltage generated by the drive system, which includes the circuit 110 and the LC resonance circuit corresponding to the inductor circuit 120 and the capacitance circuit 130 from the selected. The LC circuit corresponds to a Q-controlled filter, where the inductor circuit can be a series inductance system such as a conventional inductor (as shown) or inductively coupled inductors (not shown). The capacitance circuit 130, which is formed at least in part by the selected one of the sensor antennas via MUX 140, has a capacitance value that varies based on a distance between the antenna and the facial skin of the user. The Q-controlled filter thus amplifies the AC voltage of the AC power at LC resonant frequency of the RF face tracking system based on the distance or proximity to the user's skin.

The sensitivity of the Q-controlled filter is illustrated in FIG. 9, where the magnitude varies as a function of frequency relative to a resonance frequency (FR) of the LC resonance circuit. As shown, for a given variation in the capacitance, the frequency (e.g., F1, F2) varies relative to the overall resonance frequency (FR) of the LC resonance circuit, yielding significant changes in the detected output signal magnitudes (e.g., M1, M2). The slope of this detected change can be significant, and used for tracking, where slope=(M2−M1)/(F2−F1).

The sensed output signal amplitude at node N2, which corresponds to V(SNS) in FIG. 8, may have an amplitude in a range of +14 volts to −14 volts (or about 28 Vp-p) as shown in FIG. 8. This AC voltage demonstrates the LC resonance operation of the driver circuit 110 with respect to the driver control signal V(D_CTL), where pulsed operation of the driver circuit 110 causes an AC response as observed by the AC waveform at node N2, V(SNS) in FIG. 8. The output of the scaler circuit 160 is also observed at node N3, as shown by V(SCALE) in FIG. 8, where the AC signal from node N2 is effectively scaled down from about 28 Vp-p to about 1 Vp-p at node N3. On the falling edge of V(D_CTL), the driver circuit 110 turns off the low driver signal to FET M1 as shown by V(L) in FIG. 8. At this edge transition the sample control circuit 180 generates a short pulse as shown by V(SH_CTL) in FIG. 8, which initiates capture of the sensed signal V(SCALE) from node N3 as described above (or node N2) by the sample and hold circuit 170, which provides a sampled signal as shown by V(SAMP). The output of the differential gain circuit 190, is then responsive and stable at a voltage, as shown by V(ADC_IN) in FIG. 8.

The proposed solution can achieve high sensitivity without the bulky inductor that would otherwise be required for a high Q factor in the LC resonant drive. This is a direct result of the circuit scheme employed, since the slope of the sensitivity and Q factor can be increased by capture of the signal with a sample and hold circuit 170 and increased gain with the differential gain circuit 190. In contrast, a conventional implementation would require the parasitic resistance of the inductor circuit 120 to be decreased as much as possible to achieve a high Q-Factor, resulting larger dimensions and increased overall cost to the system. However, a lower Q-factor inductor can be used in the present scheme, achieving small form factors with a compact inductor, saving area and reducing power consumption, while also reducing cost without sacrificing circuit performance.

The RF face tracking scheme employed herein captures the signal amplitude difference between the baseline and any other facial gesture that is detected by the user during operation. The baseline level can be changed by adjusting the signal VREF with the controller circuit 103, which can optionally be calibrated. The resonant drive from the driver circuit 110 and the LC resonance circuit doesn't require a high Q-factor when the slope is close to the operating frequency since the system processes the relative changes in the value of the captured signals. Thus, a low power face tracking solution for MR wearable device can be achieved with the proposed resonant drive scheme.

The controller circuit 103 may, in some examples, be implemented as a microprocessor unit or a microcontroller unit (hereinafter, MCU). The MCU can be configured via software or firmware instructions to control the operation of the circuits 100-700, including adjustment of any control signals, adjustment of VREF, capture of signals, effective to control any aspects of the above described circuits. In some examples, the MCU may include a processor or controller core, an analog-to-digital converter (ADC), a digital-to-analog converter (DAC), one or more pulse or clock generators, and/or one or more voltage generators (e.g., for VREF). IN other examples, the MCU may be implemented as an ASIC that includes additional functions. Example operation of the controller circuit are described below.

During operation, the controller circuit 103 can select a configuration for MUX 140 via the adjustments to the multiplexer control signal (M_CTL) at node N13. Once an antenna is selected by the controller circuit 103, the selected one of the antennas 150 is effectively coupled to node N2.

The controller circuit 103 will selectively activate the driver circuit 110 via adjustments to the driver control signal D_CTL at node N13 to couple of node N1 between node N11 and node NO. Since the inductor circuit 120 is coupled to the selected one of the antennas 150 at node N2, the characteristic sense capacitor 130 (CS) forms an LC resonance circuit. By pulse modulating the coupling of node N1 between node N11 and node NO, the LC resonant circuit is excited to generate an oscillating signal at node N3, which can be observed for face tracking. Based on the high Q resonance characteristics of the LC filter, the transient response will correspond to an AC signal at node N2.

The resonance frequency of the LC filter will change with variations in the sense capacitor from the antenna, which changes responsive to facial movement relative to the location of the antenna. For a given fixed input frequency, the gain and phase of the output signals from the LC filter will change with sensed capacitance variations. Very large output signals (e.g., in a range of about 20 Vp-p to about 50 Vp-p) can be achieved with a relatively small input signals (e.g., in a range of about 1 Vp-p to about 5 Vp-p) due to the peak gain and high Q at the resonant frequency of the LC filter.

After the sensed signal for the one selected antenna is captured (e.g., ANT1), additional processing may be done in a similar fashion to capture the sensed signals for the other antennas (e.g., ANT2, . . . ANTN). Thus, the controller circuit 103 time-division multiplexes the operation of each of the antennas to capture multiple points of data for face tracking. For simplicity, a single sense capacitor is shown, but each antenna has its own sense capacitance value.

Many benefits may be achieved by the proposed scheme. A highlighted aspect is that component size for the required inductor is reduced since the inductor requirement are relaxed. A compact design may thus be achieved that is suitable in a wearable device. Additionally, the reduced component size is achieved with a lower performance inductor, which yields a reduced cost of parts necessary in the implementation. Also, power consumption is reduced by employing the disclosed techniques, providing longer battery life and better consumer experience.

The disclosure presented herein also encompasses the subject matter set forth in the following clauses:

Example Clause 1: A battery operated device for face tracking based on sensed movement of a user's skin, the battery operated device comprising: an inductor circuit (120) coupled between a first node (N2) and a second node (N2); a variable capacitor circuit (130) coupled between the second node (N2) and a circuit ground (NO), wherein the inductor circuit (120) and the capacitor circuit (130) together form an LC resonance circuit, wherein the capacitance varies responsive to a distance between an antenna and the user's skin: a driver circuit (110) that includes a first power port coupled to the battery (N11), a second power port coupled to the circuit ground (NO), a control port coupled to a control node (N13), and an output coupled to the first node (N1), wherein the driver circuit is configured to selectively couple the first node to one of the battery (N11) and the circuit ground (NO) responsive to a control signal (D_CTL) received from the control node (N13) such that the LC resonance circuit is operated at a frequency responsive to the variable capacitance: a sample and hold circuit (170) that samples an output associated with the second node (N2) to provide a sampled signal (SAMP), wherein the sample time of the sample and hold circuit is triggered on a falling edge associated with the output of the driver circuit (110); and a differential gain circuit (190) that receives the sampled signal (SAMP) from the sample and hold circuit (170) and generates an output signal (ADC_IN) responsive to the facial movements of the user.

Example Clause 2: The battery operated device of Clause 1, further comprising a wearable frame, wherein the antenna is positioned about a location on the wearable from, and wherein a characteristic capacitance of the antenna varies based on distance between the antenna and the user's skin.

Example Clause 3: The battery operated device of any of the above Clauses, further comprising: a multiplexer circuit that includes a control port coupled to the control node, an input port couped to the second node, and a plurality of output ports, wherein each of the plurality of output ports is coupled to a respective one of a plurality of antennas, and wherein the multiplexer circuit is configured to selectively couple one of the plurality of antennas to the second node responsive to a control signal received from the control node such that the capacitance of the antenna corresponds to a selected one of the plurality of antennas.

Example Clause 4: The battery operated device of any of the above Clauses, further comprising a scaler circuit that includes an input port coupled to the second node and an output port coupled to a third node, wherein the scaler circuit is configured to receive a sensed signal from the second node and provides a scaled version of the sensed signal at the third node, wherein the third node corresponds to an input to the sample and hold circuit.

Example Clause 5: The battery operated device of Clause 4, wherein the scaler circuit comprises: a first capacitor coupled between the second node and an intermediate node, a first resistor coupled between the intermediate node and the third node, a second resistor coupled between a DC source and the third node, and a third resistor coupled between the third node and the circuit ground.

Example Clause 6: The battery operated device of Clause 5, wherein the DC source of the scaler circuit corresponds to the battery.

Example Clause 7: The battery operated device of any of Clause 5 or Clause 6, the scaler circuit further comprising a first diode coupled in parallel with the second resistor, and a second diode coupled in parallel with the third resistor.

Example Clause 8: The battery operated device of any of the above Clauses, further comprising a sample control circuit that is configured to detect an edge transition associated with the driver circuit, and generate a sample control signal to trigger the sample and hold circuit.

Example Clause 9: The battery operated device of Clause 8, wherein the sample control circuit is an edge detector circuit that includes a capacitor, a resistor, a diode and a buffer, wherein: the capacitor is coupled between an output of the driver circuit to an input of the buffer: the resistor and diode are coupled together in parallel, with one side coupled to the input of buffer BUF and the other side coupled to the circuit ground: and the buffer includes an output that is the control input to the sample and hold circuit.

Example Clause 10: The battery operated device of any of the above Clauses, further comprising a controller circuit configured to generate control signals for one or more of the driver circuit, the sample and hold circuit, and the differential gain circuit.

Example Clause 11: The battery operated device of Clause 10, wherein the controller circuit comprises one or more of: a processor core, a controller core, an analog-to-digital converter (ADC), a digital-to-analog converter (DAC), a pulse generator, a clock generator, or a voltage generator.

Example Clause 12: The battery operated device of Clause 10, wherein the controller circuit comprises one of: an application specific integrated circuit (ASIC), a microprocessor unit, or a microcontroller unit.

Example Clause 13: The battery operated device of any of the above Clauses, wherein the driver circuit is a half-bridge driver that includes a logic block, a gate driver block, a first FET, and a second FET, wherein: the logic block includes an input port coupled to receive the control signal from the control node, and provides a high drive signal and a low drive signal responsive to the control signal: the gate driver block includes a high side output that is coupled to a gate of the first FET and responsive to the high drive signal, a low side output that is coupled to a gate of the second FET and responsive to the low drive signal: the first FET includes a drain coupled to the battery and as source coupled to the first node; and the second FET includes a drain coupled to the first node and a source coupled to the circuit ground.

Example Clause 14: The battery operated device of any of the above Clauses, wherein the sample and hold circuit includes a sampler circuit and a low pass filter circuit.

Example Clause 15: The battery operated device of any of the above Clauses, wherein the differential gain circuit a comprises: an amplifier with a non-inverting input, an inverting input, and an amplifier output: a first resistor coupled between the non-inverting input and an output of the sample and hold circuit: a second resistor coupled between the non-inverting input and the circuit ground; a third resistor coupled between the inverting input and a reference voltage: and a fourth resistor coupled between the inverting input and the amplifier output.

Example Clause 16: The battery operated device of any of the above Clauses, wherein the differential gain circuit provides a gain given as: V(ADC_IN)=[V(SAMP)−VREF)]*GAIN, where VREF is provided by the controller circuit, and V(SAMP) is the output of the sample and hold circuit.

Example Clause 17: A battery operated device for face tracking based on sensed movement of a user's skin, the battery operated device comprising: an inductor circuit (120) coupled between a first node (N2) and a second node (N2): a variable capacitor circuit (130) coupled between the second node (N2) and a circuit ground (NO), wherein the inductor circuit (120) and the capacitor circuit (130) together form an LC resonance circuit, wherein the capacitance varies responsive to a distance between an antenna and the user's skin: a driver circuit (110) that includes a first power port coupled to the battery (N11), a second power port coupled to the circuit ground (NO), a control port coupled to a control node (N13), and an output coupled to the first node (N1), wherein the driver circuit is configured to selectively couple the first node to one of the battery (N11) and the circuit ground (NO) responsive to a control signal (D_CTL) received from the control node (N13) such that the LC resonance circuit is operated at a frequency responsive to the variable capacitance: a scaler circuit that includes an input coupled to the second node (N2) and an output coupled to a third node (N3), wherein the scaler circuit is configured to sense a signal (SNS) from the second node (N2) and responsively provide a scaled sense signal (SCALE) at the third node (N3): a sample and hold circuit (170) that includes an input coupled to the third node (N3), and an output coupled to a fourth node (N4), wherein the sample and hold circuit (170) is configured to sample the scaled sense signal (SCALE) from the third node (N3) and responsively provide a sampled signal (SAMP) at the fourth node, wherein the sample time of the sample and hold circuit is triggered on an edge transition associated with the driver circuit (110); and a differential gain circuit (190) that includes a first input coupled to the fourth node, a second input coupled to a reference voltage (VREF), and an output coupled to a sixth node, wherein the differential gain circuit (190) is configured to receive the sampled signal (SAMP) from the sample and hold circuit (170) at the fourth node (N4), compare the sampled signal (SAMP) to the reference voltage, and generate an output signal (ADC_IN) at the sixth node that includes gain given as: V(ADC_IN)=[V(SAMP)−VREF)]*GAIN.

Example Clause 18: The battery operated device of Clause 17, wherein the scaler circuit comprises: a first capacitor coupled between the second node and an intermediate node, a first resistor coupled between the intermediate node and the third node, a second resistor coupled between a DC source and the third node, and a third resistor coupled between the third node and the circuit ground.

Example Clause 19: The battery operated device of any of Clause 17 or Clause 18, further comprising a sample control circuit that is configured to detect an edge transition associated with the driver circuit, and generate a sample control signal to trigger the sample and hold circuit.

Example Clause 20: The battery operated device of any of Clause 17 or Clause 18, wherein the sample control circuit is an edge detector circuit that includes a capacitor, a resistor, a diode and a buffer, wherein: the capacitor is coupled between an output of the driver circuit to an input of the buffer; the resistor and diode are coupled together in parallel, with one side coupled to the input of buffer BUF and the other side coupled to the circuit ground: and the buffer includes an output that is the control input to the sample and hold circuit.

Example Clause 21. The battery operated device of any of Clause 17 through Clause 20 wherein the differential gain circuit a comprises: an amplifier with a non-inverting input, an inverting input, and an amplifier output: a first resistor coupled between the non-inverting input and an output of the sample and hold circuit; a second resistor coupled between the non-inverting input and the circuit ground; a third resistor coupled between the inverting input and a reference voltage: a fourth resistor coupled between the inverting input and the amplifier output: wherein the first resistor and the third resistor each have a value given as RI: the second resistor and the fourth resistor each have a value given as RG; and the value of GAIN is determined by the ration of RG/RI.

Example Clause 22: A battery operated device for face tracking based on sensed movement of a user's skin, the battery operated device comprising: an inductor circuit (120) coupled between a first node (N2) and a second node (N2): a variable capacitor circuit (130) coupled between the second node (N2) and a circuit ground (NO), wherein the inductor circuit (120) and the capacitor circuit (130) together form an LC resonance circuit, wherein the capacitance varies responsive to a distance between an antenna and the user's skin; a driver circuit (110) that includes a first power port coupled to the battery (N11), a second power port coupled to the circuit ground (NO), a control port coupled to a control node (N13), and an output coupled to the first node (N1), wherein the driver circuit is configured to selectively couple the first node to one of the battery (N11) and the circuit ground (NO) responsive to a control signal (D_CTL) received from the control node (N13) such that the LC resonance circuit is operated at a frequency responsive to the variable capacitance: a scaler circuit that includes an input coupled to the second node (N2) and an output coupled to a third node (N3), wherein the scaler circuit is configured to sense a signal (SNS) from the second node (N2) and responsively provide a scaled sense signal (SCALE) at the third node (N3): a sample control circuit (180) that is configured to detect an edge transition associated with the driver circuit (110) and responsively generate a sample control signal (SH_CTL); a sample and hold circuit (170) that includes an input coupled to the third node (N3), and an output coupled to a fourth node (N4), wherein the sample and hold circuit (170) is configured to sample the scaled sense signal (SCALE) from the third node (N3) and responsively provide a sampled signal (SAMP) at the fourth node, wherein the sample time of the sample and hold circuit is triggered by the sample control signal (SH_CTL); a differential gain circuit (190) that includes a first input coupled to the fourth node (N4), a second input coupled to a reference voltage (VREF), and an output coupled to a sixth node, wherein the differential gain circuit (190) is configured to receive the sampled signal (SAMP) from the sample and hold circuit (170) at the fourth node (N4), compare the sampled signal (SAMP) to the reference voltage, and generate an output signal (ADC_IN) at the sixth node that includes gain given as: V(ADC_IN)=[V(SAMP)−VREF)]* GAIN; and a controller circuit (103) that generates the control signal at the control node (N13) for the driver circuit (110), converts the signal from the sixth node from analog to digital, and provides the converted signals to an application processor to detect facial expressions of the user.

It will be understood that the configurations and/or approaches described herein are exemplary in nature, and that these specific embodiments or examples are not to be considered in a limiting sense, because numerous variations are possible. The specific circuits, devices and systems described herein may represent one or more of any number of strategies. As such, various system and/or circuit components may be broken into additional functions or circuits, and/or combined with other functions or circuits as may be desirable in a specific implementation The subject matter of the present disclosure includes all novel and non-obvious combinations and sub-combinations of the various processes, circuits, devices, systems and configurations, and other features, functions and/or properties disclosed herein, as well as any and all equivalents thereof.

We claim:

1. A battery operated device for face tracking based on sensed movement of a user's skin, the battery operated device comprising:
    an inductor circuit (120) coupled between a first node (N2) and a second node (N2);
    a variable capacitor circuit (130) coupled between the second node (N2) and a circuit ground (NO), wherein the inductor circuit (120) and the capacitor circuit (130) together form an LC resonance circuit, wherein a variable capacitance responsive to a distance between an antenna and the user's skin;
    a driver circuit (110) that includes a first power port coupled to the battery (N11), a second power port coupled to the circuit ground (NO), a control port coupled to a control node (N13), and an output coupled to the first node (N1), wherein the driver circuit is configured to selectively couple the first node to one of the battery (N11) and the circuit ground (NO) responsive to a control signal (D_CTL) received from the control node (N13) such that the LC resonance circuit is operated at a frequency responsive to the variable capacitance;
    a sample and hold circuit (170) that samples an output associated with the second node (N2) to provide a sampled signal (SAMP), wherein a sample time of the sample and hold circuit is triggered on a falling edge associated with the output of the driver circuit (110); and a differential gain circuit (190) that receives the sampled signal (SAMP) from the sample and hold circuit (170) and generates an output signal (ADC_IN) responsive to the facial movements of the user.

2. The battery operated device of claim 1, further comprising a wearable frame, wherein the antenna is positioned about a location on the wearable from, and wherein a characteristic capacitance of the antenna varies based on distance between the antenna and the user's skin.

3. The battery operated device of claim 1, further comprising: a multiplexer circuit that includes a control port coupled to the control node, an input port couped to the second node, and a plurality of output ports, wherein each of the plurality of output ports is coupled to a respective one of a plurality of antennas, and wherein the multiplexer circuit is configured to selectively couple one of the plurality of antennas to the second node responsive to a control signal received from the control node such that the capacitance of the antenna corresponds to a selected one of the plurality of antennas.

4. The battery operated device of claim 1, further comprising a scaler circuit that includes an input port coupled to the second node and an output port coupled to a third node, wherein the scaler circuit is configured to receive a sensed signal from the second node and provides a scaled version of the sensed signal at the third node, wherein the third node corresponds to an input to the sample and hold circuit.

5. The battery operated device of claim 4, wherein the scaler circuit comprises: a first capacitor coupled between the second node and an intermediate node, a first resistor coupled between the intermediate node and the third node, a second resistor coupled between a DC source and the third node, and a third resistor coupled between the third node and the circuit ground.

6. The battery operated device of claim 5, wherein the DC source of the scaler circuit corresponds to the battery.

7. The battery operated device of claim 5, the scaler circuit further comprising a first diode coupled in parallel with the second resistor, and a second diode coupled in parallel with the third resistor.

8. The battery operated device of claim 1, further comprising a sample control circuit that is configured to detect an edge transition associated with the driver circuit, and generate a sample control signal to trigger the sample and hold circuit.

9. The battery operated device of claim 8, wherein the sample control circuit is an edge detector circuit that includes a capacitor, a resistor, a diode and a buffer, wherein:
the capacitor is coupled between an output of the driver circuit to an input of the buffer;
the resistor and diode are coupled together in parallel, with one side coupled to the input of buffer BUF and the other side coupled to the circuit ground; and
the buffer includes an output that is the control input to the sample and hold circuit.

10. The battery operated device of claim 1, further comprising a controller circuit is configured to generate control signals for one or more of: the driver circuit, the sample and hold circuit, and the differential gain circuit.

11. The battery operated device of claim 10, wherein the controller circuit comprises one or more of: a processor core, a controller core, an analog-to-digital converter (ADC), a digital-to-analog converter (DAC), a pulse generator, a clock generator, or a voltage generator.

12. The battery operated device of claim 10, wherein the controller circuit comprises one of: an application specific integrated circuit (ASIC), a microprocessor unit, or a microcontroller unit.

13. The battery operated device of claim 1, wherein the driver circuit is a half-bridge driver that includes a logic block, a gate driver block, a first FET, and a second FET, wherein:
the logic block includes an input port coupled to receive the control signal from the control node, and provides a high drive signal and a low drive signal responsive to the control signal;
the gate driver block includes a high side output that is coupled to a gate of the first FET and responsive to the high drive signal, a low side output that is coupled to a gate of the second FET and responsive to the low drive signal;
the first FET includes a drain coupled to the battery and as source coupled to the first node; and
the second FET includes a drain coupled to the first node and a source coupled to the circuit ground.

14. The battery operated device of claim 1, wherein the sample and hold circuit includes a sampler circuit and a low pass filter circuit.

15. The battery operated device of claim 1, wherein the differential gain circuit a comprises:
an amplifier with a non-inverting input, an inverting input, and an amplifier output;
a first resistor coupled between the non-inverting input and an output of the sample and hold circuit;
a second resistor coupled between the non-inverting input and the circuit ground;
a third resistor coupled between the inverting input and a reference voltage; and
a fourth resistor coupled between the inverting input and the amplifier output.

16. The battery operated device of claim 15, wherein the differential gain circuit provides a gain given as: V(ADC_IN)=[V(SAMP)−VREF)]*GAIN, where VREF is provided by the controller circuit, and V(SAMP) is the output of the sample and hold circuit.

17. A batter operated device for face tracking based on sensed movement of a user's skin, the battery operated device comprising:
an inductor circuit (120) coupled between a first node (N2) and a second node (N2);
a variable capacitor circuit (130) coupled between the second node (N2) and a circuit ground (NO), wherein the inductor circuit (120) and the capacitor circuit (130) together form an LC resonance circuit, wherein a variable capacitance responsive to a distance between an antenna and the user's skin;
a driver circuit (110) that includes a first power port coupled to the battery (N11), a second power port coupled to the circuit ground (NO), a control port coupled to a control node (N13), and an output coupled to the first node (N1), wherein the driver circuit is configured to selectively couple the first node to one of the battery (N11) and the circuit ground (NO) responsive to a control signal (D_CTL) received from the control node (N13) such that the LC resonance circuit is operated at a frequency responsive to the variable capacitance;
a scaler circuit that includes an input coupled to the second node (N2) and an output coupled to a third node (N3), wherein the scaler circuit is configured to sense a signal (SNS) from the second node (N2) and responsively provide a scaled sense signal (SCALE) at the third node (N3);

a sample and hold circuit (170) that includes an input coupled to the third node (N3), and an output coupled to a fourth node (N4), wherein the sample and hold circuit (170) is configured to sample the scaled sense signal (SCALE) from the third node (N3) and responsively provide a sampled signal (SAMP) at the fourth node, wherein a sample time of the sample and hold circuit is triggered on an edge transition associated with the driver circuit (110); and a differential gain circuit (190) that includes a first input coupled to the fourth node, a second input coupled to a reference voltage (VREF), and an output coupled to a sixth node, wherein the differential gain circuit (190) is configured to receive the sampled signal (SAMP) from the sample and hold circuit (170) at the fourth node (N4), compare the sampled signal (SAMP) to the reference voltage, and generate an output signal (ADC_IN) at the sixth node that includes gain given as: V(ADC_IN)=[V(SAMP)−VREF)]*GAIN.

18. The battery operated device of claim 17, further comprising a sample control circuit that is configured to detect an edge transition associated with the driver circuit, and generate a sample control signal to trigger the sample and hold circuit.

19. The battery operated device of claim 17, wherein the differential gain circuit comprises:
   an amplifier with a non-inverting input, an inverting input, and an amplifier output;
   a first resistor coupled between the non-inverting input and an output of the sample and hold circuit;
   a second resistor coupled between the non-inverting input and the circuit ground;
   a third resistor coupled between the inverting input and a reference voltage;
   a fourth resistor coupled between the inverting input and the amplifier output;
   wherein
      the first resistor and the third resistor each have a value given as RI;
      the second resistor and the fourth resistor each have a value given as RG; and
      the value of GAIN is determined by the ration of RG/RI.

20. A battery operated device for face tracking based on sensed movement of a user's skin, the battery operated device comprising:
   an inductor circuit (120) coupled between a first node (N2) and a second node (N2);
   a variable capacitor circuit (130) coupled between the second node (N2) and a circuit ground (NO), wherein the inductor circuit (120) and the capacitor circuit (130) together form an LC resonance circuit, wherein a variable capacitance responsive to a distance between an antenna and the user's skin;
   a driver circuit (110) that includes a first power port coupled to the battery (N11), a second power port coupled to the circuit ground (NO), a control port coupled to a control node (N13), and an output coupled to the first node (N1), wherein the driver circuit is configured to selectively couple the first node to one of the battery (N11) and the circuit ground (NO) responsive to a control signal (DCTL) received from the control node (N13) such that the LC resonance circuit is operated at a frequency responsive to the variable capacitance; a scaler circuit that includes an input coupled to the second node (N2) and an output coupled to a third node (N3), wherein the scaler circuit is configured to sense a signal (SNS) from the second node (N2) and responsively provide a scaled sense signal (SCALE) at the third node (N3); a sample control circuit (180) that is configured to detect an edge transition associated with the driver circuit (110) and responsively generate a sample control signal (SH_CTL);
   a sample and hold circuit (170) that includes an input coupled to the third node (N3), and an output coupled to a fourth node (N4), wherein the sample and hold circuit (170) is configured to sample the scaled sense signal (SCALE) from the third node (N3) and responsively provide a sampled signal (SAMP) at the fourth node, wherein a sample time of the sample and hold circuit is triggered by the sample control signal (SH_CTL);
   a differential gain circuit (190) that includes a first input coupled to the fourth node, a second input coupled to a reference voltage (VREF), and an output coupled to a sixth node, wherein the differential gain circuit (190) is configured to receive the sampled signal (SAMP) from the sample and hold circuit (170) at the fourth node (N4), compare the sampled signal (SAMP) to the reference voltage, and generate an output signal (ADC_IN) at the sixth node that includes gain given as: V(ADC_IN)−[V(SAMP)−VREF)]*GAIN; and
   a controller circuit (103) that generates the control signal at the control node (N13) for the driver circuit (110), converts the signal from the sixth node from analog to digital, and provides the converted signals to an application processor to detect facial expressions of the user.

* * * * *